United States Patent
Pasini et al.

(10) Patent No.: US 11,898,256 B2
(45) Date of Patent: Feb. 13, 2024

(54) METHOD AND APPARATUS FOR PRODUCING HYDROGEN GAS IN AN ELECTROLYTIC CELL

(71) Applicant: Moleaer, Inc., Carson, CA (US)

(72) Inventors: Federico Pasini, Hermosa Beach, CA (US); Bruce Scholten, Carson, CA (US)

(73) Assignee: Moleaer, Inc., Hawthorne, CA (US)

( * ) Notice: Subject to any disclaimer, the term of this patent is extended or adjusted under 35 U.S.C. 154(b) by 0 days.

(21) Appl. No.: 18/348,973

(22) Filed: Jul. 7, 2023

(65) Prior Publication Data

US 2023/0349053 A1 Nov. 2, 2023

Related U.S. Application Data

(63) Continuation of application No. 17/825,534, filed on May 26, 2022.

(60) Provisional application No. 63/195,543, filed on Jun. 1, 2021.

(51) Int. Cl.
| | |
|---|---|
| *C25B 1/50* | (2021.01) |
| *C25B 1/04* | (2021.01) |
| *B01F 23/237* | (2022.01) |
| *B01F 23/231* | (2022.01) |
| *B01F 23/2375* | (2022.01) |
| *B01F 23/2373* | (2022.01) |

(52) U.S. Cl.
CPC .......... *C25B 1/50* (2021.01); *B01F 23/2373* (2022.01); *B01F 23/2375* (2022.01); *B01F 23/23121* (2022.01); *B01F 23/23764* (2022.01); *C25B 1/04* (2013.01)

(58) Field of Classification Search
CPC ......... C25B 1/04; C25B 1/50; B01F 23/2373; B01F 23/2375; B01F 23/23121; B01F 23/2312
See application file for complete search history.

(56) References Cited

U.S. PATENT DOCUMENTS

| | | | |
|---|---|---|---|
| 10,591,231 | B2 | 3/2020 | Russell et al. |
| 10,598,447 | B2 | 3/2020 | Russell et al. |
| 11,331,633 | B2 | 5/2022 | Scholten et al. |
| 2014/0116889 | A1 | 5/2014 | Nakamoto |
| 2014/0183054 | A1 | 7/2014 | Legzdins |
| 2014/0209479 | A1 | 7/2014 | Hoffmann et al. |
| 2016/0066760 | A1 | 3/2016 | Citsay |
| 2020/0003506 | A1 | 1/2020 | Russell et al. |

(Continued)

FOREIGN PATENT DOCUMENTS

WO   WO 2020/079020   4/2020

OTHER PUBLICATIONS

U.S. Appl. No. 63/150,973, Pasini et al., filed Feb. 18, 2021.

(Continued)

*Primary Examiner* — Nicholas A Smith
(74) *Attorney, Agent, or Firm* — Fish & Richardson P.C.

(57) ABSTRACT

A method and apparatus for producing hydrogen gas whereby a nanobubble generator introduces nanobubbles at a concentration of at least $10^7$ nanobubbles per cm$^3$ into an electrolytic cell comprising a pair of electrodes and a hydrogen-containing, electrolyzable liquid, and the electrolytic cell is operated to produce hydrogen gas.

27 Claims, 6 Drawing Sheets

(56) References Cited

U.S. PATENT DOCUMENTS

2020/0289992 A1 9/2020 Scholten et al.
2021/0337833 A1* 11/2021 Liu ......................... A23L 2/50

OTHER PUBLICATIONS

Argulo et al., "Influence of Bubbles on the Energy Conversion Efficiency of Electrochemical Reactors," Joule, Mar. 18, 2020, 4(3): 555-579.
International Search Report and Written Opinion in International Appln. No. PCT/US2022/31181, dated Sep. 7, 2022, 11 pages.

* cited by examiner

METHOD AND APPARATUS FOR PRODUCING HYDROGEN GAS IN AN ELECTROLYTIC CELL

CLAIM OF PRIORITY

This application is a continuation of pending U.S. patent application Ser. No. 17/825,534, filed May 26, 2022, which claims priority to U.S. Provisional Application No. 63/195,543, filed on Jun. 1, 2021, the entire contents of which are hereby incorporated by reference.

TECHNICAL FIELD

This invention relates to producing hydrogen gas in an electrolytic cell.

BACKGROUND

An electrolytic cell includes a pair of electrodes and a liquid electrolyte, typically water. When operated, the cell electrolyzes the liquid to produce hydrogen gas at the cathode and oxygen gas at the anode. The hydrogen and oxygen gas produced can be supplied as fuel to a fuel cell.

During electrolysis, bubbles can form at the electrodes. Although not present in high concentrations, these bubbles are considered undesirable because they can block the electrode surface and ion conducting pathways, leading to energy losses. See Argulo et al., "*Influence of Bubbles on the Energy Conversion Efficiency of Electrochemical Reactors*," Joule, 4(3):555-579 (Mar. 18, 2020). Several approaches to addressing this problem by promoting bubble detachment have been proposed, including modifying the electrode surface, adjusting the composition of the electrolyte, inducing flow in the electrolyte, and applying magnetic or ultrasonic energy to the cell. Id.

SUMMARY

The inventors have discovered that introducing high concentrations of nanobubbles into an electrolytic cell surprisingly improves the efficiency of hydrogen gas production. Without being bound by theory, it is believed that the presence of high nanobubble concentrations increases the charge density in the volume of electrolyzable liquid, thereby spatially extending the region that is subject to the effect of an electric potential. High nanobubble concentrations also increase the interaction between the electrodes and the electrolyte. As a result, electrical resistance decreases and the amount of energy required to produce hydrogen gas decreases, thereby reducing overall cost. Accordingly, in a first aspect there is described a method of producing hydrogen gas that includes (a) introducing nanobubbles at a concentration of at least $10^6$ nanobubbles per $cm^3$ from a nanobubble generator into an electrolytic cell comprising a pair of electrodes and a hydrogen-containing, electrolyzable liquid; and (b) operating the electrolytic cell to produce hydrogen gas. In some embodiments, the nanobubble concentration is at least $10^7$ nanobubbles per $cm^3$, at least $10^8$ nanobubbles per $cm^3$, at least $10^9$ nanobubbles per $cm^3$, or at least $10^{10}$ nanobubbles per $cm^3$.

The nanobubble concentration is expressed as nanobubbles per $cm^3$. It is measured by collecting 3 samples from the electrolytic cell (which receives the effluent of the nanobubble generator) and analyzing each sample within 20 minutes after it has been obtained by Nanoparticle Tracking Analysis using a Nanosight NS3000 analyzer available from Malvern PANalytical. Each sample is filtered using a 0.45 μm filter before it is analyzed using the Nanosight NS3000 analyzer.

The nanobubble generator may be located within the electrolytic cell (e.g., immersed in the electrolyzable liquid) or outside the electrolytic cell (e.g., as a separate module in liquid communication with the electrolytic cell). In some embodiments, the nanobubble generator and the electrolytic cell are located within a common housing.

In some embodiments, the method further includes extracting hydrogen gas from the electrolytic cell as it is produced or after a pre-determined time period. The ability to store the hydrogen gas in the cell and extract it when needed enables the cell to act as an energy storage device.

The hydrogen produced by the cell may be supplied as "fuel" to a fuel cell, which then produces energy. By reducing the amount of energy needed to produce the hydrogen "fuel," the method improves the overall efficiency of energy production of the fuel cell.

In some embodiments, the electrolytic cell further produces oxygen gas, which can be extracted from the electrolytic cell as it is produced or after a pre-determined time period.

The nanobubbles are filled with gas. In some embodiments, the gas is selected from the group consisting of air, nitrogen, carbon dioxide, $NO_X$, methane, and combinations thereof.

The hydrogen-containing, electrolyzable liquid may include water, ammonia, wastewater, or combinations thereof. The liquid may contain salts. As used herein, "wastewater" includes, but is not limited to, municipal wastewater, industrial wastewater, storm water, black water, gray water, process water from fermentation or mining processes, or combinations thereof. In some embodiments, wastewater includes ammonia. Using wastewater as the electrolyzable liquid provides a convenient means for treating wastewater to remove contaminants, while at the same time providing an easily hydrolyzable source of hydrogen for the electrolytic cell.

The nanobubble generator may have a variety of configurations and employ a variety of means for generating nanobubbles. In one example, the nanobubble generator includes: (a) an elongate housing having a first end and a second end, the housing defining a liquid inlet, a liquid outlet, and an interior cavity adapted for receiving a liquid carrier from a liquid source; (b) a gas-permeable member at least partially disposed within the interior cavity of the housing, the gas-permeable member having an open end adapted for receiving a pressurized gas from a gas source, a closed end, and a porous sidewall extending between the open and closed ends, the gas-permeable member defining an inner surface, an outer surface, and a lumen. The housing and gas-permeable member are configured such that the flow rate of the liquid carrier from the liquid source as it flows parallel to the outer surface of the gas-permeable member from the liquid inlet to the liquid outlet is greater than the turbulent threshold of the liquid to create turbulent flow conditions, thereby allowing the liquid to shear gas from the outer surface of the gas-permeable member and form nanobubbles in the liquid carrier. For example, the housing and gas-permeable member may be configured to produce a flow rate of at least 2 m/s. This generator is described in U.S. Pat. Nos. 10,591,231 and 10,598,447, each entitled "Compositions Containing Nano-Bubbles in a Liquid Carrier," which are assigned to the same assignee as the present application and hereby incorporated by reference in their entirety.

This nanobubble generator, as described in U.S. Ser. No. 63/150,973 entitled "Nano-Bubble Generator," filed Feb. 18, 2021, which is assigned to the same assignee as the present application and hereby incorporated by reference in its entirety, may further include at least one electrical conductor adapted to generate a magnetic flux parallel to the outer surface of the gas-permeable member (which may be electrically conductive) as the liquid carrier flows from the liquid inlet to the liquid outlet. In some embodiments, the electrical conductor is in the form of an electromagnetic coil. In some embodiments, this nanobubble generator may include a helicoidal member adapted to cause the liquid carrier to rotate as it flows from the liquid inlet to the liquid outlet. The helicoidal member, in some embodiments, may include an electromagnetic coil adapted to generate a magnetic flux parallel to the outer surface of the gas-permeable member as the liquid carrier flows from the liquid inlet to the liquid outlet. In some embodiments, the nanobubble generator further comprises a hydrofoil located in the interior cavity of the housing.

Another example of a nanobubble generator, also described in U.S. Ser. No. 63/150,973, includes (a) an elongate housing including a first end and a second end, the housing further including an interior cavity and a gas inlet adapted for introducing pressurized gas from a gas source into the interior cavity; (b) a gas-permeable member at least partially disposed within the interior cavity of the housing, the gas-permeable member including a liquid inlet adapted for receiving a liquid from a liquid source, a liquid outlet, and a porous sidewall extending between the liquid inlet and liquid outlet, and defining an inner surface, an outer surface, and a lumen through which liquid flows; and (c) at least one electrical conductor adapted to generate a magnetic flux parallel to the inner surface of the gas-permeable member as the liquid carrier flows from the liquid inlet to the liquid outlet. The housing and gas-permeable member are configured such that the flow rate of the liquid carrier from the liquid source as it flows parallel to the inner surface of the gas-permeable member from the liquid inlet to the liquid outlet is greater than the turbulent threshold of the liquid to create turbulent flow conditions, thereby allowing the liquid to shear gas from the inner surface of the gas-permeable member and form nano-bubbles in the liquid carrier.

Another example of a suitable nanobubble generator is described in U.S. Ser. No. 16/818,217 entitled "Submersible Non-Bubble Generating Device and Method," filed Mar. 13, 2020, which is assigned to the same assignee as the present application and hereby incorporated by reference in its entirety. The nanobubble generator includes: (a) a motor having a rotatable shaft; (b) an axially rotatable permeable member including a body having a wall and a plurality of pores through which gas introduced into the axially rotatable permeable member can flow, the axially rotatable permeable member couplable to a gas inlet configured to introduce gas from a gas source into the axially rotatable permeable member, the axially rotatable permeable member coupled to the rotatable shaft of the motor and adapted to rotate along with the rotatable shaft; and (c) a rotatable tube support including an elongate body having a wall and defining an inner cavity. The wall defines a plurality of perforations. The inner cavity of the rotatable tube support is configured to house the axially rotatable permeable member. The rotatable tube support is coupled to and rotatable along with the rotatable shaft of the motor. The rotatable tube support, when rotated, is adapted to introduce the liquid into the inner cavity of the rotatable tube support and move the liquid away from an outer surface of the body of the rotatable permeable member. The axially rotatable permeable member, when rotated, is adapted to simulate turbulent flow above the turbulent threshold in the liquid that allows the liquid to shear gas from the outer surface of the axially rotatable permeable member, thereby forming nano-bubbles in the liquid.

Also described is an apparatus for producing hydrogen gas that includes: (a) a nanobubble generator capable of generating at least $10^6$ nanobubbles per $cm^3$ (e.g., at least $10^7$ nanobubbles per $cm^3$) and (b) an electrolytic cell in communication with the nanobubble generator, the electrolytic cell comprising a pair of electrodes. The electrolytic cell is capable of generating hydrogen gas from a hydrogen-containing, electrolyzable liquid. The nanobubble concentration is determined as described above. The apparatus may further include a fuel cell in communication with the electrolytic cell having an inlet for receiving hydrogen gas from the electrolytic cell.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
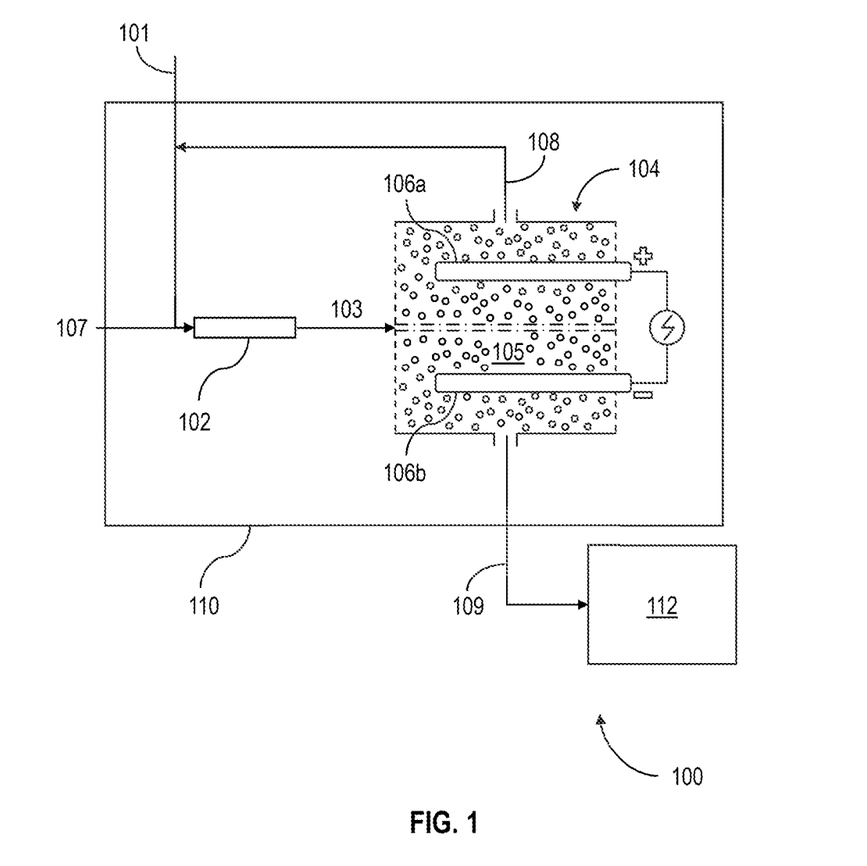
FIG. 1 is a schematic drawing of an embodiment of a hydrogen gas-producing method and apparatus according to the invention.

Referring to FIG. 1, there is shown a hydrogen gas production system 100 that includes a nanobubble generator 102 in communication with an electrolytic cell 104. As shown in FIG. 1, nanobubble generator 102 and electrolytic cell 104 are separate modules contained within a common housing 110. However, in some embodiments, the nanobubble generator may be included (e.g., submersed) in the electrolyte 105 of cell 104. In other embodiments, the electrolytic cell may be included within the nanobubble generator. In yet other embodiments, the nanobubble generator and electrolytic cell are separate modules but are not contained within a common housing.

To create nanobubbles, a source of gas 101 and a source of hydrogen-containing liquid 107 are input to the nanobubble generator 102. Examples of suitable gases include air, nitrogen, carbon dioxide, $NO_X$, methane, and combinations thereof. The choice of gas will depend on the end use of the hydrogen gas generating system. Liquid 107 is typically an aqueous liquid. When system 100 is incorporated into a wastewater treatment plant, liquid 107 may be wastewater. Liquid 107, in turn, may contain other dissolved components such as ammonia.

Nanobubble generator 102 creates a composition 103 comprising a high concentration of nanobubbles dispersed in a liquid carrier and inputs that composition to electrolytic cell 104. The concentration of nanobubbles is at least $10^6$ nanobubbles per $cm^3$, at least $10^7$ nanobubbles per $cm^3$, at least $10^8$ nanobubbles per $cm^3$, at least $10^9$ nanobubbles per $cm^3$, or at least $10^{10}$ nanobubbles per $cm^3$. As described in the Summary above, introducing a high concentration of nanobubbles into the electrolytic cell improves the efficiency of hydrogen gas production.

Cell 104 includes an anode 106a and a cathode 106b. Cell 104 reduces hydrogen in the hydrogen-containing liquid carrier to hydrogen gas at cathode 106b. The hydrogen gas so produced may be input via line 109 to a fuel cell 112. Alternatively, it may be recycled or introduced to devices such as gas-powered turbines. The hydrogen gas may be extracted as it is produced. Alternatively, it may remain stored in cell 104 and extracted when desired. In this respect, cell 104 acts as an energy storage medium.

Oxidation occurs at anode 106a of cell 104. When the liquid carrier is an aqueous carrier, oxidation of the carrier generates oxygen gas at anode 106a. The oxygen gas may be recycled via line 108 and used as a gas source for forming the nanobubbles. Alternatively, the oxygen gas may be supplied to fuel cell 112.

A variety of nanobubble generators can be used to produce the nanobubble-containing composition. One example, shown in FIG. 2 and described in the aforementioned U.S. Pat. Nos. 10,591,231 and 10,598,447, features an exemplary apparatus 10 that includes a housing 12 of cylindrical form. A porous, gas permeable, ceramic tube 20 spans between the end walls 22 of the housing 12, and is rigidly supported at both ends. Sealing structures 24 including O-rings are provided between the tube 20 and the end walls 22.

Figure 2:
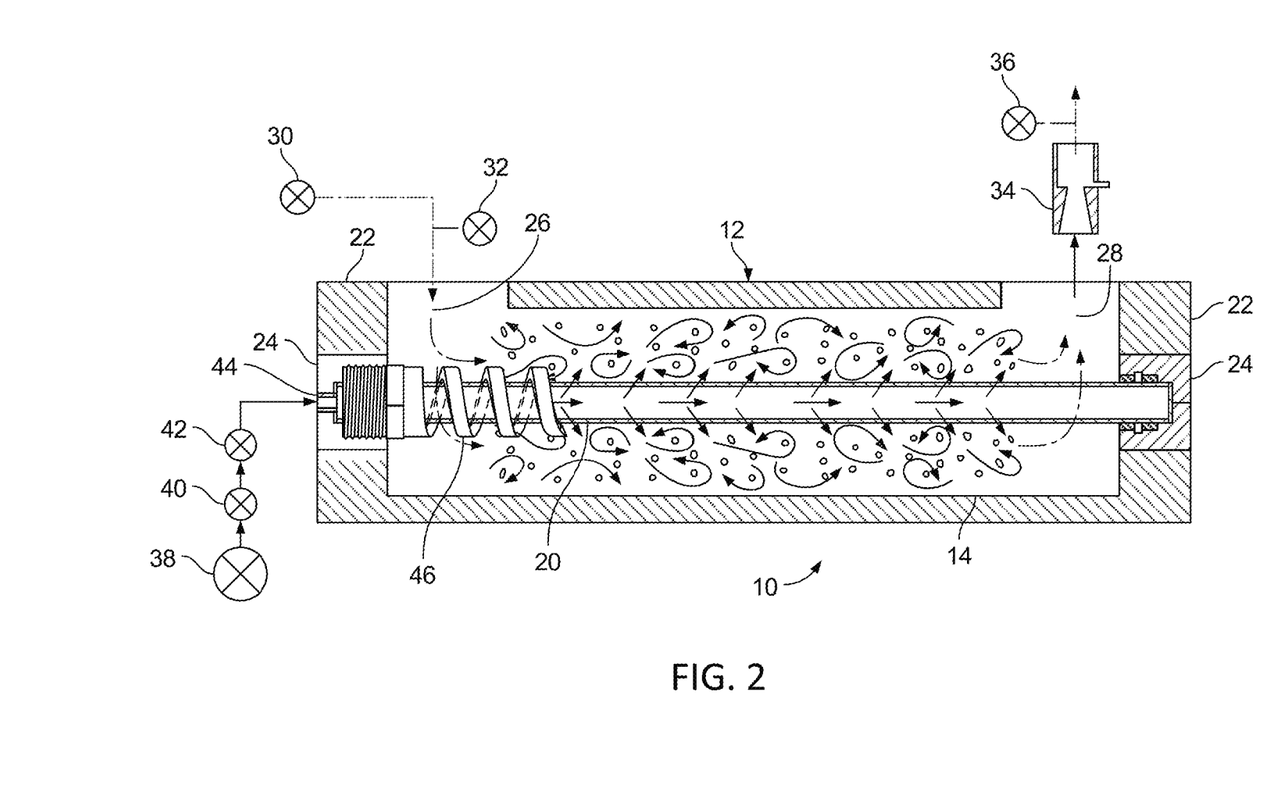
FIG. 2 is a schematic drawing of an exemplary apparatus for producing a composition that includes nanobubbles dispersed in a liquid carrier.

There is an inlet to the housing at 26 and an outlet from the housing at 28. A pump 30 is connected to the inlet 26 and there is a pressure regulator 32 between the pump 30 and the inlet 26. A jet pump 34 and a pressure gauge 36 are connected to the outlet 28. A source 38 of gas under pressure is connected via a pressure regulator 40, a flow meter 42, and/or sealing structures 24 to an inlet 44 to the tube 20. It will be noted that the tube 20 is closed at the end opposite to the inlet 44. The apparatus 10 can optionally include a helical member 46 that projects into the flowing liquid and enhances the turbulence caused by the position of the inlet. The apparatus is configured to generate flow above the turbulent threshold, e.g., a flow rate of at least 2 m/s. The turbulent flow above the turbulent threshold performs two functions: a) shearing nascent bubbles from the surface of the tube 20; and b) removing newly formed bubbles from the vicinity of the surface of the tube 20. The turbulence within the housing 12 of the apparatus 10 achieves both of these objectives.

Figure 3:
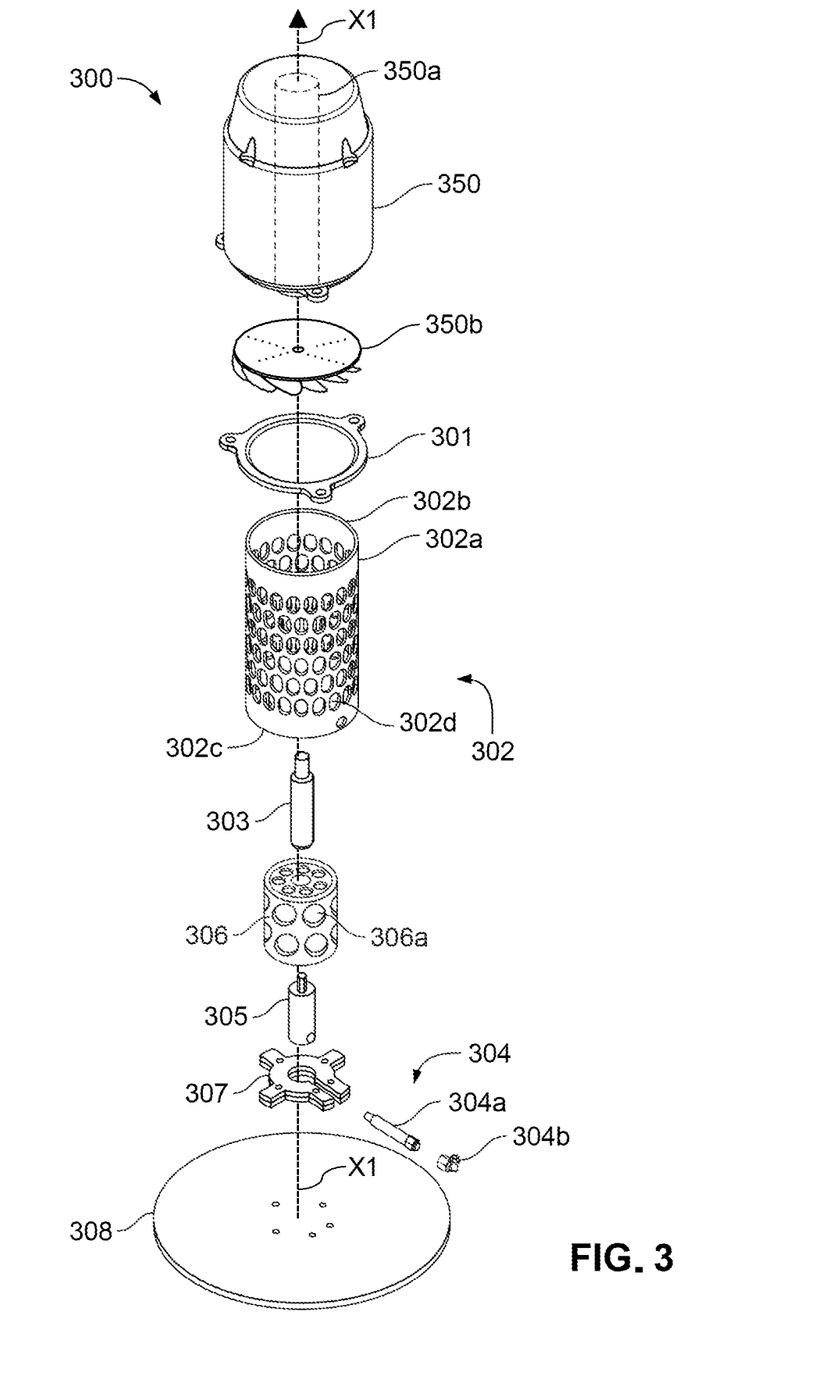
FIG. 3 is an exploded perspective view of a second exemplary apparatus for producing a composition that includes nanobubbles dispersed in a liquid carrier.

A second example of a suitable nanobubble generator, particularly useful for systems in which the nanobubble generator is submersed within the electrolytic cell, is shown in FIG. 3 and described in the aforementioned U.S. Ser. No. 16/818,217, which is incorporated by reference. As shown in FIG. 3, a device 300 includes a base 301, a driving mechanism 350 coupled to the base 301, a protective housing 302 coupled to the base 301, a rotatable permeable member 303 disposed within the protective housing 302, and a gas inlet 304 (which can optionally include pipe fitting 304a and/or gas tube fittings 304b) is indirectly coupled to the rotatable permeable member 303 (e.g., the gas inlet 304 can be indirectly coupled the rotatable permeable member via a bracket 307, a rotary union 305, and/or a plate 308). In some embodiments, the device 300 also includes a tube support 306 coupled to the rotatable permeable member 303 to reduce or eliminate the twisting moment on the rotatable permeable member 303. The driving mechanism 350 can provide rotation. The driving mechanism 350 includes a rotatable component 350a. In some implementations, the driving mechanism 350 is a motor, and the rotatable component 350a is a rotatable shaft. In some implementations, the driving mechanism 350 is a gearbox, and the rotatable component 350a is a gear shaft.

The protective housing 302 is defined by a lateral wall 302a extending between a first end 302b and a second end 302c. The first end 302b is coupled to the base 301. The protective housing 302 defines multiple perforations 302d configured to pass liquid through the lateral wall 302a of the protective housing 302.

The rotatable permeable member 303 has a body defining a longitudinal axis "X1" and can be axially rotated about the longitudinal axis X1. The rotatable permeable member 303 is coupled to the rotatable component 350a of the driving mechanism 350 (for example, the rotatable shaft of the motor or the gear shaft of the gearbox), such that the rotatable permeable member 303 rotates with the rotatable component 350a of the driving mechanism 350.

Figure 4A:
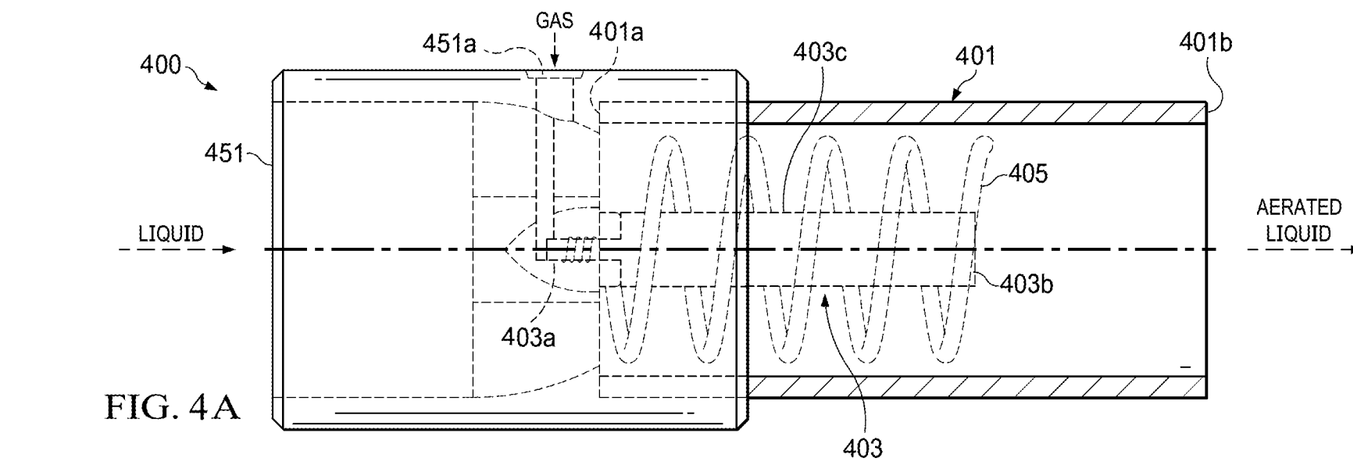
FIG. 4A is a top view of a third exemplary apparatus for producing a composition comprising nano-bubbles dispersed in a liquid carrier.
Figure 4B:
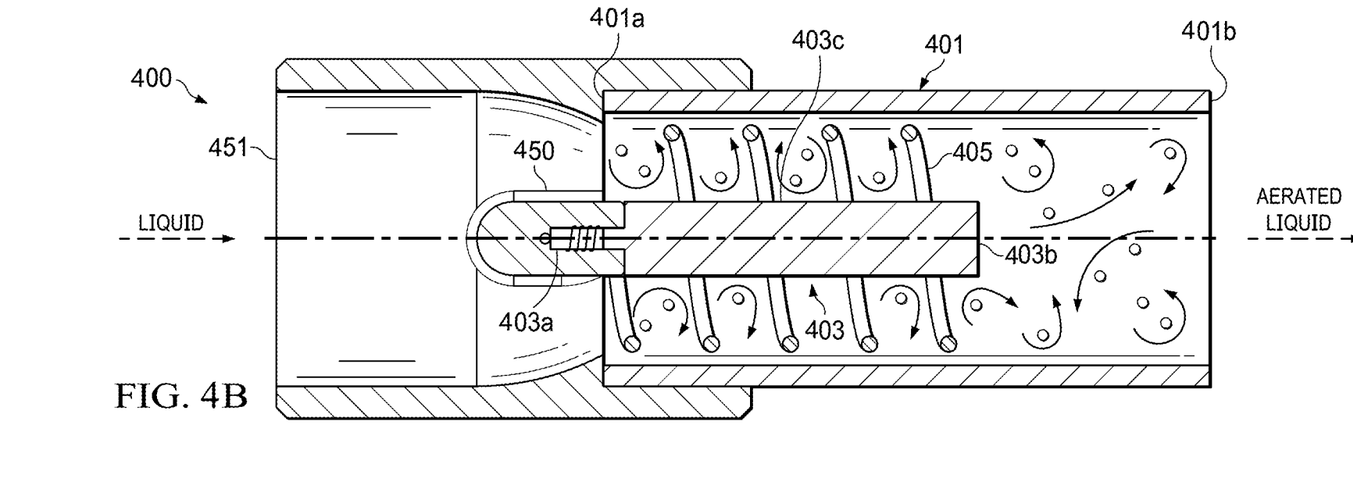
FIG. 4B is a cross-sectional side view of the apparatus of FIG. 1A.
Figure 4C:
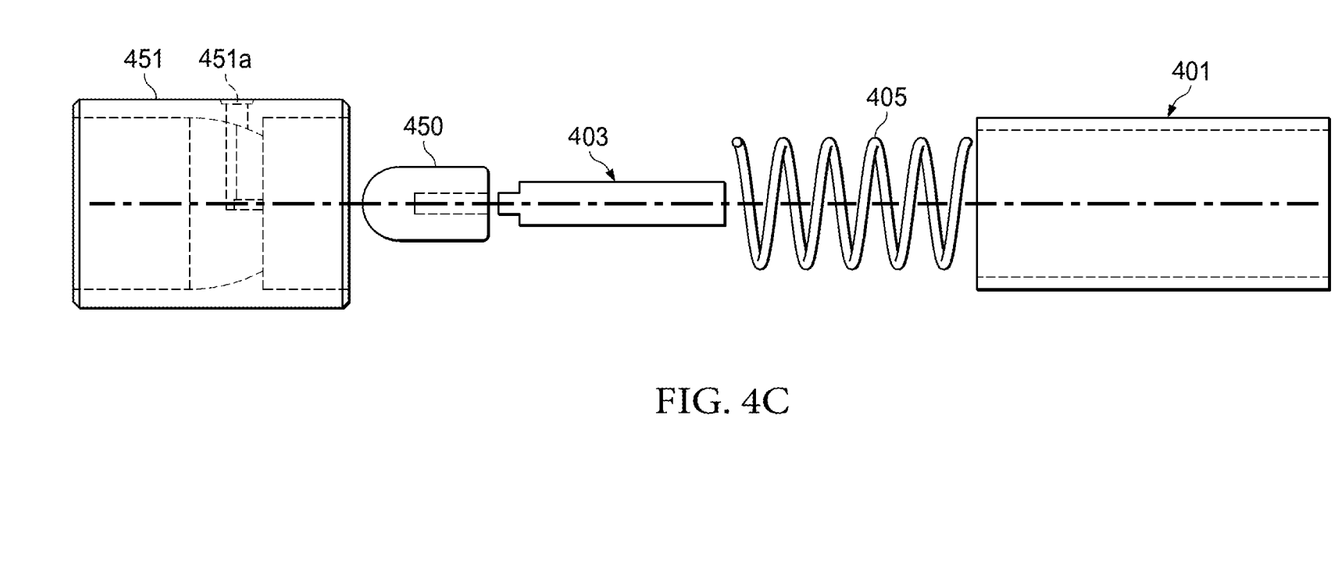
FIG. 4C is an exploded view of the apparatus of FIG. 1A.

A third example of a suitable nanobubble generator is shown in FIGS. 4A-4C, and described in the aforementioned U.S. Ser. No. 63/150,973, which is incorporated by reference. As shown in FIGS. 4A-4C, the apparatus 400 includes a housing 401, a permeable member 403, and an electrical conductor 405. The elongate housing 401 is defined by a first end 401a, a second end 401b, and an interior cavity adapted for receiving a liquid carrier from a liquid source. The housing 401 includes an inlet and an outlet. The first end 401a can be the inlet and the second end 401b can be the outlet.

The apparatus 400 includes the gas-permeable member 403 at least partially disposed within the interior cavity of the housing 401. The permeable member 403 defines an inner surface, an outer surface, and a lumen. The permeable member 403 can include a first end 403a adapted for receiving a pressurized gas from a gas source, a second end 403b, and a porous sidewall 403c extending between the first and second ends 403a, 403b. The first end 403a of the permeable member 403 can be an open end and the second end 403b of the permeable member 403 can be a closed end. The housing 401 can be coupled to the mount 451, for example, the first end 401a of the housing 401 can be coupled to the mount 451. The mount 451 can provide fluid inlet and/or outlet ports into its coupled components. For example, the mount 451 can define a port 451a that is in fluid communication with the first end 403a of the permeable member 403.

The housing 401 and permeable member 403 can be arranged such that the flow rate of the liquid carrier from the liquid source, as it flows parallel to the outer surface of the permeable member 403 from the liquid inlet to the liquid outlet, is greater than the turbulent threshold of the liquid to create turbulent flow conditions, thereby allowing the liquid to shear gas from the outer surface of the gas-permeable member and form nano-bubbles in the liquid carrier.

As shown in FIGS. 4A-C, the apparatus 400 includes an electrical conductor 405 in the form of a helicoidal member (e.g., a helical electrode) that is located in the interior cavity of the housing 401. The electrical conductor 405 is adapted to generate a magnetic flux parallel to the outer surface of the permeable member 403 as the liquid carrier flows from the liquid inlet to the liquid outlet of the housing 401. Preferably, the electrical conductor 405 is adapted to generate a high frequency oscillating magnetic flux.

The apparatus 400 can optionally include a hydrofoil 450 shaped to induce rotation in the liquid carrier flowing through the apparatus 400. In some embodiments, the hydrofoil 450 is shaped (e.g., with tapered and/or curved surfaces) to induce super-cavitation in the liquid carrier flowing through the apparatus 400. For example, the hydrofoil 450 can be shaped to create high turbulence regions in the fluid flowing through the apparatus 400 based on the surface of the hydrofoil 450 and the turbulent trailing edge downstream of the hydrofoil 450. In this disclosure, the terms "downstream" and "upstream" are in relation to the overall flow direction of the liquid carrier, for example, through the apparatus 400. For example, in FIGS. 4A-B, the overall flow direction of the liquid carrier through the apparatus 400 is from left to right, so "downstream" correlates to "to the right of" and "upstream" correlates to "to the left of."

Figure 5:
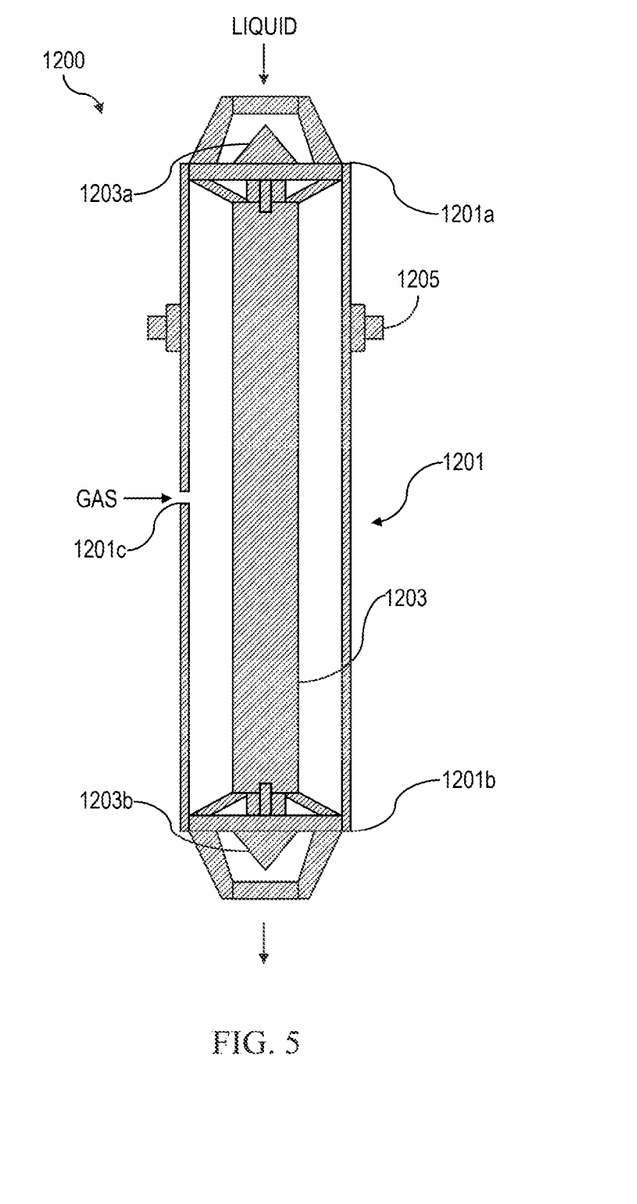
FIG. 5 is a schematic drawing of an exemplary apparatus for producing a composition that includes nanobubbles dispersed in a liquid carrier.

A fourth example of a suitable nanobubble generator is shown in FIG. 5, and described in the aforementioned U.S. Ser. No. 63/150,973, which is incorporated by reference. As shown in FIG. 5, apparatus 1200 includes a housing 1201 adapted to receive a gas from a gas source and a gas-permeable member 1203 adapted to receive a liquid carrier from a liquid source. The gas-permeable member 1203 can be substantially similar to the permeable member 20 (shown in FIG. 2). Liquid is flowed into the permeable member 1203 and gas flows around an outer surface of the permeable member 1203 in apparatus 1200. Gas flows into the lumen of the permeable member 1203 through the pores to generate nano-bubbles that are sheared and dispersed into the liquid flowing within the permeable member 1203.

The housing 1201 of apparatus 1200 includes a first end 1201a and a second end 1201b that are closed ends. A gas flows from a source through a port 1201c defined by the housing 1201 into an interior cavity of the housing 1201. Although shown in FIG. 5 as being located near the middle of the housing 1201, the port 1201c can be located at any point of the housing 1201, as long as the port 1201c provides an entry point for gas to enter the interior cavity of the housing 1201.

The permeable member 1203 has a first end 1203a that can serve as a liquid inlet adapted for receiving a liquid carrier. The permeable member 1203 includes pores that allow a gas to pass through its walls. The permeable member 1203 is enclosed within the interior cavity of the housing 1201 such that the gas within the housing flows across the walls of the permeable member 1203. Pressure is applied to flow gas through the pores of the permeable member 1203 and into the lumen of the permeable member 1203. As the gas flows through the pores of the permeable member 1203, nano-bubbles are formed. The liquid carrier flowing through the lumen of the permeable member 1203 shears the nano-bubbles from an inner surface of the permeable member 1203 as they form. The second end 1203b of the permeable member 1203 can be an open end or an outlet for discharging the liquid carrier carrying formed nano-bubbles.

The apparatus 1200 of FIG. 5 includes an electrical conductor 1205 in the form of an electromagnetic coil (e.g., stator) located on an exterior of the housing 1201. The electrical conductor 1205 surrounds at least a portion of the permeable member 1203 and is located upstream of the port 1201c. One or more electrical conductors can be implemented in a variety of ways, as described above.

Apparatus 1200 can optionally include a component (e.g., helicoidal member and/or a hydrofoil) to induce rotation in the liquid flowing through the permeable member 1203, as described previously herein. The optional component can be located in the interior cavity of the housing 1201.

A number of embodiments of the invention have been described. Nevertheless, it will be understood that various modifications may be made without departing from the spirit and scope of the invention. Accordingly, other embodiments are within the scope of the following claims.

What is claimed is:

1. A method of producing hydrogen gas comprising:
   (a) introducing nanobubbles at a concentration of at least $10^7$ nanobubbles per $cm^3$ from a nanobubble generator into an electrolytic cell comprising a pair of electrodes and a hydrogen-containing, electrolyzable liquid; and
   (b) operating the electrolytic cell to produce hydrogen gas.

2. The method of claim 1, comprising introducing nanobubbles at a concentration of at least $10^8$ nanobubbles per $cm^3$.

3. The method of claim 1, comprising introducing nanobubbles at a concentration of at least $10^9$ nanobubbles per $cm^3$.

4. The method of claim 1, comprising introducing nanobubbles at a concentration of at least $10^{10}$ nanobubbles per $cm^3$.

5. The method of claim 1, wherein the nanobubble generator is located within the electrolytic cell.

6. The method of claim 1, wherein the nanobubble generator is located outside the electrolytic cell.

7. The method of claim 1, wherein the nanobubble generator and the electrolytic cell are located within a common housing.

8. The method of claim 1, further comprising extracting hydrogen gas from the electrolytic cell as it is produced or after a pre-determined time period.

9. The method of claim 8, further comprising supplying hydrogen gas from the electrolytic cell to a fuel cell.

10. The method of claim 1, wherein the electrolytic cell further produces oxygen gas, the method further comprising extracting oxygen gas from the electrolytic cell as it is produced or after a pre-determined time period.

11. The method of claim 1, wherein the nanobubbles are filled with a gas selected from the group consisting of air, nitrogen, carbon dioxide, $NO_X$, methane, and combinations thereof.

12. The method of claim 1, wherein the hydrogen-containing, electrolyzable liquid comprises water.

13. The method of claim 1, wherein the hydrogen-containing, electrolyzable liquid comprises ammonia.

14. The method of claim 1, wherein the hydrogen-containing, electrolyzable liquid comprises wastewater.

15. The method of claim 1, wherein the nanobubble generator comprises:
   (a) an elongate housing comprising a first end and a second end, the housing defining a liquid inlet, a liquid outlet, and an interior cavity adapted for receiving a liquid carrier from a liquid source;
   (b) a gas-permeable member at least partially disposed within the interior cavity of the housing, the gas-permeable member comprising an open end adapted for receiving a pressurized gas from a gas source, a closed end, and a porous sidewall extending between the open and closed ends, the gas-permeable member defining an inner surface, an outer surface, and a lumen, the housing and gas-permeable member being configured such that the flow rate of the liquid carrier from the liquid source as it flows parallel to the outer surface of the gas-permeable member from the liquid inlet to the liquid outlet is greater than the turbulent threshold of the liquid to create turbulent flow conditions, thereby allowing the liquid to shear gas from the outer surface of the gas-permeable member and form nano-bubbles in the liquid carrier.

16. The method of claim 15, wherein the nanobubble generator further comprises at least one electrical conductor adapted to generate a magnetic flux parallel to the outer surface of the gas-permeable member as the liquid carrier flows from the liquid inlet to the liquid outlet.

17. The method of claim 16, wherein the gas-permeable member is electrically conductive.

18. The method of claim 16, wherein the electrical conductor comprises an electromagnetic coil.

19. The method of claim 15, wherein the nanobubble generator comprises a helicoidal member adapted to cause the liquid carrier to rotate as it flows from the liquid inlet to the liquid outlet.

20. The method of claim 15, wherein the nanobubble generator comprises a helicoidal member adapted to cause the liquid carrier to rotate as it flows from the liquid inlet to the liquid outlet, the helicoidal member comprising an electromagnetic coil adapted to generate a magnetic flux parallel to the outer surface of the gas-permeable member as the liquid carrier flows from the liquid inlet to the liquid outlet.

21. The method of claim 15, wherein the nanobubble generator further comprises a hydrofoil located in the interior cavity of the housing.

22. The method of claim 1, wherein the nanobubble generator comprises:
   a motor comprising a rotatable shaft;
   an axially rotatable permeable member including a body having a wall and a plurality of pores through which gas introduced into the axially rotatable permeable member can flow, the axially rotatable permeable member couplable to a gas inlet configured to introduce gas from a gas source into the axially rotatable permeable member, the axially rotatable permeable member coupled to the rotatable shaft of the motor and adapted to rotate along with the rotatable shaft; and
   a rotatable tube support including an elongate body having a wall and defining an inner cavity, the wall defining a plurality of perforations, the inner cavity of the rotatable tube support configured to house the axially rotatable permeable member, the rotatable tube support coupled to and rotatable along with the rotatable shaft of the motor, wherein the rotatable tube support, when rotated, is adapted to introduce the liquid into the inner cavity of the rotatable tube support and move the liquid away from an outer surface of the body of the rotatable permeable member, wherein the axially rotatable permeable member, when rotated, is adapted to simulate turbulent flow above the turbulent threshold in the liquid that allows the liquid to shear gas from the outer surface of the axially rotatable permeable member, thereby forming nano-bubbles in the liquid.

23. The method of claim 1, wherein the nanobubble generator comprises:
   (a) an elongate housing comprising a first end and a second end, the housing further comprising an interior cavity and a gas inlet adapted for introducing pressurized gas from a gas source into the interior cavity;
   (b) a gas-permeable member at least partially disposed within the interior cavity of the housing, the gas-permeable member comprising a liquid inlet adapted for receiving a liquid from a liquid source, a liquid outlet, and a porous sidewall extending between the liquid inlet and liquid outlet, the gas-permeable member defining an inner surface, an outer surface, and a lumen through which liquid flows;
   (c) at least one electrical conductor adapted to generate a magnetic flux parallel to the inner surface of the gas-permeable member as the liquid carrier flows from the liquid inlet to the liquid outlet, the housing and gas-permeable member being configured such that the flow rate of the liquid carrier from the liquid source as it flows parallel to the inner surface of the gas-permeable member from the liquid inlet to the liquid outlet is greater than the turbulent threshold of the liquid to create turbulent flow conditions, thereby allowing the liquid to shear gas from the inner surface of the gas-permeable member and form nano-bubbles in the liquid carrier.

24. An apparatus for producing hydrogen gas comprising:
   (a) a nanobubble generator capable of generating at least $10^7$ nanobubbles per $cm^3$; and
   (b) an electrolytic cell in communication with the nanobubble generator, the electrolytic cell comprising a pair of electrodes,
   wherein the electrolytic cell is capable of generating hydrogen gas from a hydrogen-containing, electrolyzable liquid containing nanobubbles at a concentration of at least $10^7$ nanobubbles per $cm^3$.

25. The apparatus of claim 24, further comprising a fuel cell in communication with the electrolytic cell having an inlet for receiving hydrogen gas from the electrolytic cell.

26. A method of producing hydrogen gas comprising:
   (a) introducing nanobubbles at a concentration of at least $10^6$ nanobubbles per $cm^3$ from a nanobubble generator into an electrolytic cell comprising a pair of electrodes and a hydrogen-containing, electrolyzable liquid; and
   (b) operating the electrolytic cell to produce hydrogen gas.

27. An apparatus for producing hydrogen gas comprising:
   (a) a nanobubble generator capable of generating at least $10^6$ nanobubbles per $cm^3$; and
   (b) an electrolytic cell in communication with the nanobubble generator, the electrolytic cell comprising a pair of electrodes,
   wherein the electrolytic cell is capable of generating hydrogen gas from a hydrogen-containing, electrolyzable liquid containing nanobubbles at a concentration of at least $10^6$ nanobubbles per $cm^3$.

* * * * *